2,899,425

PROCESS FOR THE ISOLATION OF CEPHALOSPORIN N

Robert Rothes Goodall and Noel Holden Sutcliffe, Manchester, England, assignors to Imperial Chemical Industries Limited, London, England, a corporation of Great Britain No Drawing. Application January 9, 1958
Serial No. 707,875

Claims priority, application Great Britain January 16, 1957

8 Claims. (Cl. 260—239.1)

This invention relates to a purification process and more particularly it relates to the purification of crude Cephalosporin N.

It is known to isolate Cephalosporin N from an impure solution thereof by contacting the said impure solution with charcoal, eluting the adsorbed antibiotic from the charcoal, contacting the eluate with alumina and then eluting the adsorbed antibiotic from the alumina and recovering the antibiotic material from the eluate by known means. This isolation process is necessarily cumbersome and tedious and furthermore, the recovery of antibiotic is poor, particularly from the alumina since although the alumina is kept at a reasonably low temperature, it is nevertheless liable to cause inactivation of some of the antibiotic.

It is also known that Cephalosporin N salts, including the barium salt, are highly soluble in water and are not readily precipitated therefrom. In known procedures, the method used to obtain a solid product from such aqueous solutions has been either to remove the aqueous medium by freeze drying, which is tedious and effects no purification, or to dilute the said aqueous solutions with a large volume of a water-miscible solvent for example alcohol or acetone until the proportion of water in the liquid phase is so reduced that the desired solids are precipitated.

We have now found that it is possible to isolate Cephalosporin N in a state of increased purity by treating a crude product containing Cephalosporin N, dissolved in methanol, with barium bromide. There is thus precipitated a non-hygroscopic barium salt of Cephalosporin N while undesired impurities are retained by the solvent medium.

According to the present invention therefore we provide a process for the purification of Cephalosporin N antibiotic material which comprises treating a solution of crude Cephalosporin N in a methanol medium with barium bromide.

The crude antibiotic material used as starting material may be obtained by any means known to the art for example it may be recovered from an eluate obtained by contacting charcoal and/or alumina with a solution containing Cephalosporin N which solution itself may be obtained from a fermentation medium after filtration from the mould.

Thus an eluate of aqueous acetone or methanol containing crude Cephalosporin N may be concentrated and the aqueous concentrate so obtained may then be dried from the frozen state and the crude solid material so obtained may be used in the process of the present invention after dissolution in methanol.

Alternatively the whole broth or fermentation medium containing Cephalosporin N may be freeze dried and the crude material so obtained then extracted with methanol. The methanolic extract thus obtained may be used as the starting material for treatment with barium bromide thereby providing Cephalosporin N of enhanced potency.

The barium bromide used as precipitating agent may be added to the methanolic solution of crude material either as a solid for example in the form of the anhydrous salt or its dihydrate or, more conveniently, in the form of its solution in a methanol medium, until no further precipitation of Cephalosporin N takes place.

A preferred process comprises treating a solution of crude Cephalosporin N material in a methanol medium with a solution of barium bromide in methanol.

The purification process of this invention is carried out in a methanol medium which may optionally contain traces of other solvents for example water provided that the said medium so used is capable of dissolving barium bromide and also of allowing the barium salt of Cephalosporin N, formed during the process, to precipitate from the said medium. Thus the methanol medium may optionally contain water for example 6% weight for weight of water. The crude Cephalosporin N material used as starting material may be present in the methanol medium in a concentration of about 0.1% or more on a weight for volume basis and the barium bromide, as stated above, may be added either as a solid or as a solution in methanol until no further precipitation of antibiotic material takes place.

The crude antibiotic material used as starting material may be subjected to a preliminary purification process by extraction with methanol. Any matter insoluble in the said methanol is rejected and the methanolic solution so obtained may then be used for treatment with barium bromide either directly as in the form of the solid salt or indirectly as in the form of a solution of the said salt in methanol.

The crude antibiotic material used as starting material may be in the form of a syrup with water and such a syrup may be obtained from an aqueous solution containing Cephalosporin N by concentration by azeotropic distillation at a suitable temperature using for example n-butanol. The mixture of aqueous syrup and n-butanol so obtained is separated and the aqueous syrup is then used as such or it may, if desired, be given a preliminary extraction with methanol thereby removing certain impurities insoluble in the said methanol. The methanolic extract so obtained may then be used in the process of the present invention.

The use of the purification process with which this invention is concerned allows crude Cephalosporin N to be recovered in a state of increased purity in the form of its non-hygroscopic barium salt as is indicated by the relative activity of the said antibiotic material against *Salmonella dublin* or compared with penicillin G by a colorimetric assay, before and after the said purification process.

The invention is illustrated but not limited by the following examples in which the parts, where used, are by weight:

*Example 1*

Crude Cephalosporin N antibiotic material is obtained by passing 370 litres of a filtered Cephalosporin containing broth (activity 45 units/ml. against *Salmonella dublin*) through a charcoal column. The column is then eluted with aqueous acetone (60% v./v. acetone) and the eluate is diluted with acetone to adjust it to 70% v./v. acetone. The solution so obtained is kept for 16 hours at 5° C.. The acetone solution is then decanted from an oily residue and is concentrated in vacuo. The aqueous concentrate so obtained is dried from the frozen state and the dried crude antibiotic material so obtained has an activity of 14.5 units/mg. against *Salmonella dublin* and 150 units/mg. compared with penicillin G by the known colorimetric assay using hydroxamic acid.

0.5 part of the crude Cephalosporin N antibiotic material obtained as described above is dissolved in 0.5 part of water. To this solution is added slowly with stirring a solution of 0.1 part of barium bromide in 8 parts of methanol. A pale buff coloured precipitate is immediately formed and the mixture is filtered, the solid residue being washed with methanol, ether and then dried. There is thus obtained 0.227 part of Sephalosporin N antibiotic material which has an activity of 18.4 units/mg. against *Salmonella dublin* and 220 units/mg. compared with penicillin G by the colorimetric assay as indicated above.

*Example 2*

0.5 part of the crude Cephalosporin N antibiotic material, obtained as described in Example 1, is lixiviated with 8 successive portions of 4 parts each of methanol and the insoluble matter is rejected. To the solution so obtained is added slowly and with stirring a solution of 0.1 part of barium bromide in 8 parts of methanol. The mixture is then filtered and the pale buff coloured solid residue is washed with methanol and ether and then dried. There is thus obtained 0.819 part of Cephalosporin N antibiotic material which has an activity of 31.5 units/mg. against *Salmonella dublin* and 282 units/mg. compared with penicillin G by the colorimetric assay as indicated in Example 1.

*Example 3*

2 parts of the crude Cephalosporin N antibiotic material obtained as described in Example 1, are lixiviated with 7 successive portions of 10 parts each of methanol and the insoluble matter is rejected. To the solution so obtained is added slowly with stirring, a solution of 0.5 part of barium bromide in 8 parts of methanol. After stirring for a further 10 minutes at 18–22° C., the mixture is filtered and the solid residue is washed with 8 parts of methanol followed by 8 parts of ether and then dried. There is thus obtained 1.3 parts of Cephalosporin N antibiotic material which has an activity of 25.8 units/mg. against *Salmonella dublin* and 232 units/mg. compared with penicillin G by the colorimetric assay as indicated in Example 1.

*Example 4*

Crude Cephalosporin N antibiotic material is obtained by passing 6 litres of a filtered Cephalosporin containing broth (activity 49.5 units/ml. against *Salmonella dublin*) through a charcoal column. The column is then washed with 1.5 litres of water and eluted with acetone. The aqueous acetone eluates are collected in 3 successive fractions each of volume 350 ml. The second fraction is dark yellow in colour and contains most of the antibiotic potency (about 200 *Salmonella dublin* units/ml.). This second fraction is concentrated in vacuo to approximately 100 ml. A 20 ml. aliquot of this concentrate is removed, and dried from the frozen state (weight of solid residue 0.96 gm., potency 9.7 *Salmonella dublin* units/mg.). The remainder of this concentrate is evaporated with 160 ml. of n-butanol under reduced pressure at a temperature not exceeding 35° C. When the volume of the lower layer is diminished to about 30 ml. a further 80 ml. of n-butanol is added and the evaporation continued until the volume of the aqueous layer is about 15 ml. The supernatant n-butanol is rejected and the syrupy aqueous layer is macerated with 3 successive 75 ml. portions of methanol, the yellow coloured extract being decanted after each treatment. During this procedure the syrup is dehydrated through a resinous stage to a finely divided solid residue which is of low potency and is rejected.

The combined methanol extracts are stirred mechanically and a solution of 0.5 gm. of barium bromide in 5 ml. of methanol is added slowly. The finely divided precipitate of barium salts is allowed to settle overnight at 5° C. and the mixture is then filtered. The solid residue is washed with acetone and dried in vacuo. There is thus obtained 0.55 gm. of Cephalosporin N antibiotic material which has an activity of 24.1 units/mg. against *Salmonella dublin*.

*Example 5*

500 parts of a filtered Cephalosporin N containing broth (activity 69 *Salmonella dublin* units/mg.) is dried from the frozen state. There is thus obtained 5.05 parts of dry solids having an activity of 5.5 *Salmonella dublin* units/mg. 2.5 parts of the solids so obtained are lixiviated with 20 parts of methanol followed by 6 successive treatments each with 10 parts of methanol. 1.67 parts of the solids remain undissolved and are rejected. 25 parts of the methanolic extract are stirred and 5 parts of a methanol solution containing 0.25 part of barium bromide are added slowly. The fine precipitate of barium salts is isolated on a sintered glass filter and dried in vacuo. 0.11 part of dried product is thus obtained and it has an activity of 11.4 *Salmonella dublin* units/mg.

What we claim is:

1. A process for the isolation of solid, non-hygroscopic Cephalosporin N antibiotic material from crude culture fluid containing same which comprises first concentrating the said crude culture fluid, then treating the concentrate with barium bromide in the presence of methanol whereby the barium salt of Cephalosporin N is precipitated and thereafter recovering said precipitate.

2. The process of claim 1 wherein said methanol includes up to 10% by weight of water.

3. The process of claim 1 wherein concentration of the crude culture fluid is brought about by lyophilic drying.

4. The process of claim 1 wherein concentration of the crude culture medium is brought about by azeotropic distillation.

5. The process of claim 4 wherein the azeotropic distillation is conducted in the presence of n-butanol.

6. The process of claim 1 wherein the barium bromide is added in solid form.

7. The process of claim 1 wherein the barium bromide is added in methanol solution.

8. The process of claim 1 wherein concentration of the crude culture fluid is continued to dryness, the residue is extracted with methanol and the resulting methanol extract is then treated with barium bromide.

References Cited in the file of this patent

Abraham et al.: Biochemical Journal, vol. 58, No. 1, September 1954, pp. 94–96.